United States Patent [19]

Tan Boon et al.

[11] Patent Number: 6,031,831

[45] Date of Patent: Feb. 29, 2000

[54] METHOD FOR REVERSE CHANNEL SOUNDING IN A COMMUNICATIONS SYSTEM

[75] Inventors: Tiong Tan Boon, Kent Ridge, Singapore; Andrew John Aftelak, Neubury, United Kingdom; Dragan Boscovic; Christopher Philip Johnson, both of Basingstoke, United Kingdom; Jonathan Alastair Gibbs, Southampton, United Kingdom; Antony John Wray, Basingstoke, United Kingdom

[73] Assignee: Motorola, Inc., Schaumburg, Ill.

[21] Appl. No.: 08/602,171

[22] Filed: Feb. 15, 1996

[30] Foreign Application Priority Data

Feb. 15, 1995 [GB] United Kingdom .................. 9502945

[51] Int. Cl.[7] ...................................................... H04J 13/00
[52] U.S. Cl. ........................................... 370/342; 370/347
[58] Field of Search ...................................... 370/318, 320, 370/321, 324, 325, 328, 331, 330, 335, 337, 341, 342, 343, 344, 347, 350, 389, 395, 400, 252, 251, 352, 254, 441, 442, 286; 455/33.1–33.4, 54.1–54.2, 51.1, 32.3, 38.1, 38.3; 375/200, 205

[56] References Cited

U.S. PATENT DOCUMENTS

| | | | |
|---|---|---|---|
| 4,969,146 | 11/1990 | Twitty et al. ............................ | 370/338 |
| 5,301,167 | 4/1994 | Proakis et al. ............................ | 455/40 |
| 5,351,134 | 9/1994 | Yaguchi et al. ..................... | 379/100.17 |
| 5,570,366 | 10/1996 | Baker et al. ............................ | 370/312 |

FOREIGN PATENT DOCUMENTS

| | | |
|---|---|---|
| 0114463A2 | 1/1984 | European Pat. Off. . |
| 0124319A1 | 7/1984 | European Pat. Off. . |
| 0353759A2 | 7/1990 | European Pat. Off. . |
| 889956 | 2/1962 | United Kingdom . |
| 2272133A | 4/1994 | United Kingdom . |
| 2268365 | 5/1994 | United Kingdom . |
| 0502945 | 2/1995 | United Kingdom . |

*Primary Examiner*—Dang Ton
*Attorney, Agent, or Firm*—Susan L. Lukasik

[57] ABSTRACT

A method is disclosed for determining current channel state information in a communications system having a first communications unit communicating to a second communications unit, wherein the first communications unit sends a channel sounding packet (32) to the second communications unit. The channel sounding packet (32) is sent a time period, t, prior to the transmission of a signal by the second communications unit to the first communications unit. The second communications unit receives the channel sounding packet (46) and processes the channel sounding packet to determine at least one channel characteristic. In response to receiving the channel sounding packet (46) the second communications unit appends frame code information (48) to the signal to be transmitted from the second communications unit to the first communications unit, to inform the first communications unit of the communications parameters that have been optimized.

25 Claims, 9 Drawing Sheets

METHOD FOR REVERSE CHANNEL SOUNDING IN A COMMUNICATIONS SYSTEM

FIELD OF THE INVENTION

This invention relates to a communications system and, in particular, to a communications system using channel sounding techniques.

BACKGROUND OF THE INVENTION

Communications systems are generally defined in terms of their communications parameters (e.g. data rate, channel bandwidth, modulation type etc.). The communications parameters of communications systems are chosen according to the characteristics of the communications channel and the type of communications required.

In mobile communications systems the propagation of signals between communicating units are affected by the rapidly varying multipath and fading characteristics of the communications channel. Consequently the communications parameters for such mobile communications systems are chosen to take into account the severe variations in the gain and delay characteristics of the channel due to multipath and fading effects.

Generally the communications parameters of a communications system are fixed. However, to maximize system performance in a mobile communications system, it would be advantageous if the communications parameters of the communications system were continuously optimized according to the current state of the rapidly varying communications channel.

In order to continuously optimize the communications parameters of a mobile communications system, accurate, real-time information on the characteristics of the communications channels is required. The information needs to be processed immediately and the communications parameters of the communications system must then be continuously optimized according to the current channel characteristics. In the past, performing this optimized accurately and in a real-time manner, has proved to be extremely difficult in a mobile environment due to the channel characteristics changing too rapidly.

In the early 1970s, proposals for determining forward channel sounding information were developed. In a communications system that uses a forward channel sounder, the transmitting unit transmits a known tone or sequence to a receiving unit. The receiving unit then processes the information and transmits the desired communications parameters, back to the transmitting unit, for use in future communications between the two communicating units.

In J. K. Cavers' paper on "Variable-Rate Transmission for Rayleigh Fading Channels" published in the IEEE Transactions on Communications, vol. COM-20, no. 1, pp. 15–22, February 1972, J. K. Cavers proposes varying the bit rate according to the state of a fading channel. J. K. Cavers also suggested that the transmitting unit determine information on the state of the communications channel by the transmitting unit requesting a feedback signal to be sent from the receiving unit back to the transmitting unit. Processing the feedback signal by the transmitting unit would then determine the state of the channel. A problem with J. K. Cavers' proposal is that the request for a feedback signal may cause additional delay and makes inefficient use of the communications channel as it does not perform automatic channel sounding.

In Hentinen's paper on "Error Performance for Adaptive Transmission on Fading Channels" published in the IEEE Transactions on Communications, vol. COM-22, no. 9, pp. 1331–1337, September 1974, Hentinen mentions investigating the use of channel sounding for optimizing the power and transmission rate control parameters of a communications system.

Additional literature on channel sounding is provided by D Parsons in his book "The Mobile Radio Propagation Channel", Chap. 8, pp. 212–252, published by Pentech Press, London, UK, 1992 in which Parsons describes the operation of channel sounding schemes as a means to measure the long term characteristics of the channel. The information provided by these measurements are averaged over a period of time and are therefore not of a real-time nature and are inadequate for an adaptive communications system operating in a mobile environment.

It is therefore desirable for a mobile communications system to employ a channel sounding technique that determines current channel state information. The communications system may then facilitate optimization of the communications parameters according to the current state of the channel.

SUMMARY OF THE INVENTION

According to the present invention, there is a method provided for determining current channel state information in a communications system having a first communications unit and a second communications unit, including the step of sending a channel sounding packet by the first communications unit to the second communications unit a time period, t, prior to transmission of a signal by the second communications unit to the first communications unit.

A preferred embodiment of the invention will now be described, by way of example only, with reference to the drawings.

DETAILED DESCRIPTION OF THE DRAWINGS

Figure 1:
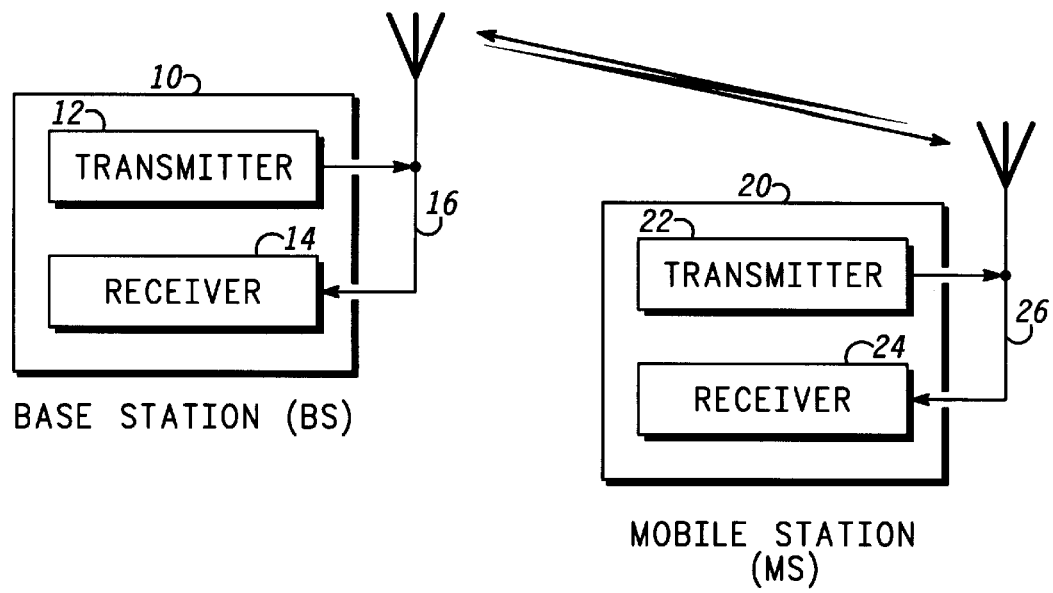
FIG. 1 shows a block diagram of a communications system.

FIG. 1 shows a block diagram of a communications system. A first communications unit is shown as a Base Station (BS) 10 and a second communications unit is shown as a Mobile Station (MS) 20. The communications system includes the BS 10, having both a transmitter 12 and a receiver 14 operably coupled to an antenna 16, for communicating to the MS 20 having both a transmitter 22 and a receiver 24 operably coupled to an antenna 26.

Figure 2:
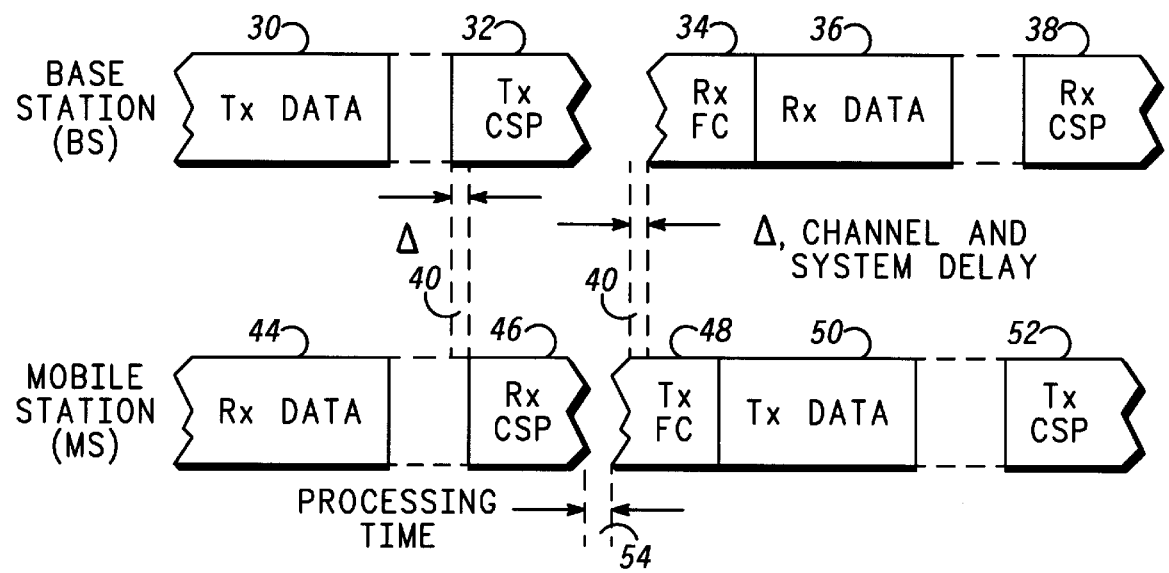
FIG. 2 shows a timing diagram for a Time Division Duplex (TDD), Frequency Division Multiple Access (FDMA) communications system according to a first aspect of a preferred embodiment of the invention.

FIG. 2 shows a timing diagram for a Time Division Duplex (TDD) Frequency Division Multiple Access (FDMA) scheme according to the preferred embodiment of the invention. In a communications system using a TDD FDMA scheme the communications units are allocated time slots on a frequency for transmission and reception of signals. The BS 10 transmits a data signal 30 to the MS 20 which, in turn, receives the data signal 44. Prior to the MS 20 responding by transmitting a data signal 50 back to the BS 10, the BS 10 transmits a Channel Sounding Packet (CSP) 32. The composition of the CSP is known to all communicating units in the communications system. In the preferred embodiment the CSP comprises eight (8) symbols of data used for channel sounding purposes.

The MS 20 receives the CSP 46 after a short period 40, due to channel propagation and system delays. The MS 20 processes the CSP to determine at least one current channel's characteristic (e.g. multipath and fading effects). After processing the CSP the MS 20 optimizes at least one of its communications parameters according to the state of the communications channel. The communications parameters may include any of the following: channel transmission rate, modulation type, modulation rate, channel coding rate, source coding rate, transmitter and/or receiver filter responses, packet length, transmitter signal power, adaptive power control levels, whether a channel equalizer is to be used, and which antennae are to be used should the communications system use a distributed antenna diversity scheme. Such communications parameters are well known to those skilled in the art and are not described in detail here.

After processing the CSP, the MS 20 begins transmission of data to the BS 10. The transmission comprises an initial Frame Code block 48 that provides details to the BS 10 of the optimized communications parameters. The Frame Code block 48 is followed by the transmitted data 50. The Frame Code 48 may include information on all of the optimized communications parameters or, more advantageously, only the communications parameters that have been modified since the last transmission. The BS 10 receives the Frame Code block 34 after a further short period 40, optimized the communications parameters of the BS 10, according to the optimized communications parameter proposed and used by the MS 20. The BS 10 then receives and demodulates the data 36.

This process is repeated for communications from the BS 10 to the MS 20. Prior to the BS 10 responding by transmitting a data signal to the MS 20, the MS 20 transmits a CSP 52 to assist the BS 10 in determining at least one current channel characteristics. The BS 10 receives the CSP, processes the information and optimized at least one of the communications parameters accordingly. The BS 10 begins transmission of data to the MS 20. The transmission comprises an initial Frame Code block providing details of the optimized communications parameters appended to the data. This process of optimizing the communication performance for the varying channel conditions continues until the communication is complete.

Figure 3:
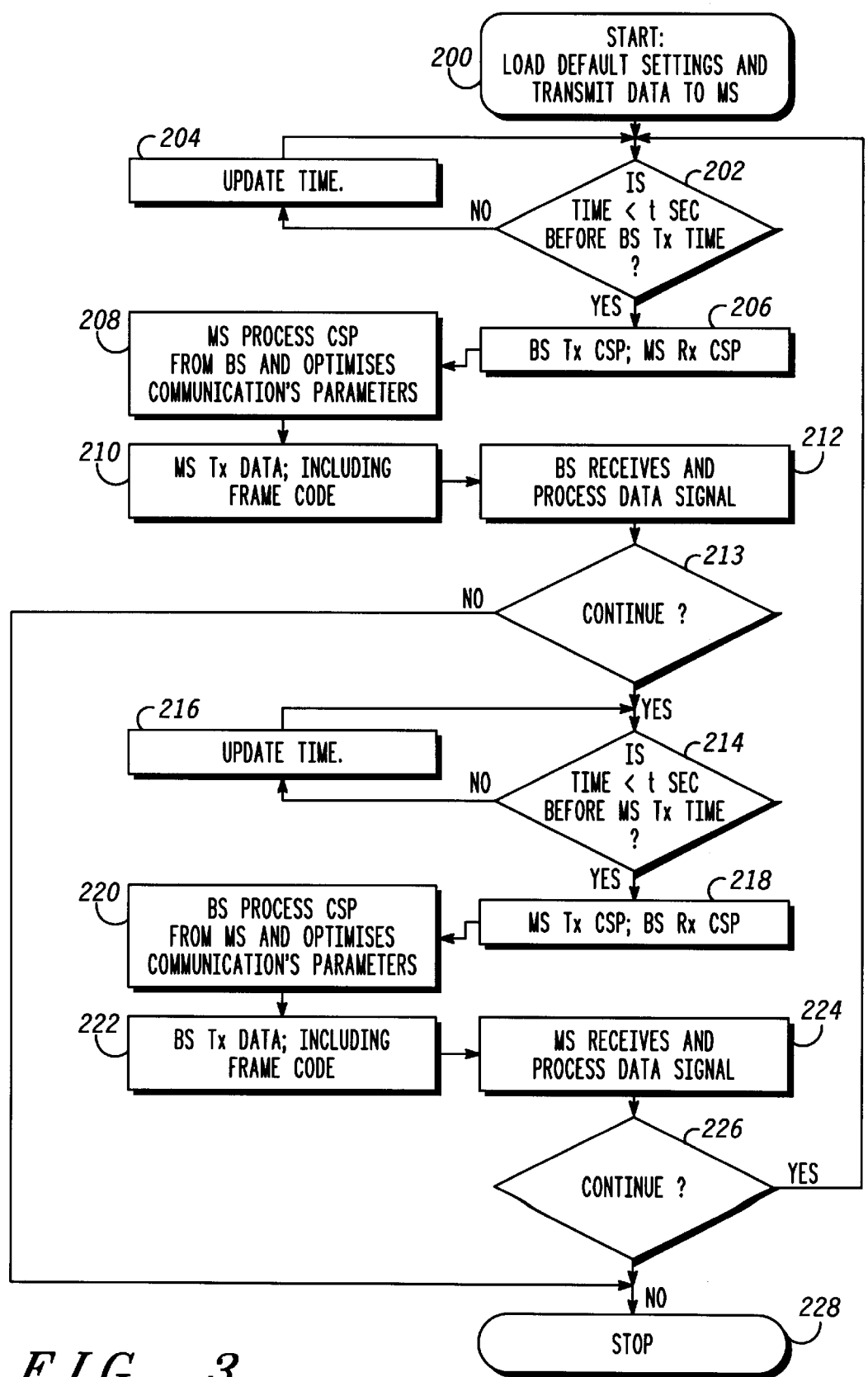
FIG. 3 shows a flow diagram illustrating the method of using reverse channel sounding information according to the first aspect of the preferred embodiment of the invention.

Referring now to FIG. 3, a flow diagram is shown illustrating a method of determining channel sounding information according to the preferred embodiment of the present invention. Particularly, the method details the determining of current channel state information in a communications system comprising a first communications unit and a second communications unit including the steps of sending a channel sounding packet by the first communications unit to the second communications unit a time period, t, prior to transmission of a signal by the second communications unit to the first communications unit. In the preferred embodiment the first communications unit is a Base Station and the second communications unit is a Mobile Station.

The Base Station BS initiates communications with the Mobile Station MS. The BS loads the default settings for at least one communications parameter of the communications system and transmits a data packet to the MS as shown in step 200. The BS then waits until a time period, t, before it anticipates receiving a response from the MS, denoted by the loop shown in steps 202 and 204. The period, t, equates approximately to the total time of the propagation delay 40 (BS to MS), the length of the CSP 46, the processing time 54 at the MS and the propagation delay 40 (MS to BS), as previously shown in FIG. 2. Advantageously the period, t, is kept to a minimum to ensure that the CSP being transmitted and processed contains the most current information on at least one channel characteristic. The time period, t, may include any of the following: switching time, frequency lock time, signal processing time, channel delay, and system delay.

When the period, t, has been reached, the BS transmits the CSP which is received by the MS as shown in step 206. The MS processes the CSP, transmitted by the BS, and optimizes its communications parameters accordingly as in step 208. The MS then transmits its data packet to the BS with a Frame Code header that provides details on the optimized communications parameters as shown in step 210. The BS receives the data packet, processes the Frame Code information and optimizes its communications parameters according to the communications parameters proposed and used by the MS and demodulates the rest of the data signal as shown in step 212. As described above the communications parameters may include any of the following: channel transmission rate, modulation type, modulation rate, channel coding rate, source coding rate, transmitter and/or receiver filter responses, packet length, transmitter signal power, adaptive power control levels, whether a channel equalizer is to be used, and which antennae are to be used should the communications system use a distributed antenna diversity scheme.

If the call is to continue, as shown in step 213, this process repeats itself with the BS communicating to the MS. The MS waits a period, t, before it anticipates receiving a response from the BS, denoted by the loop shown in steps 214 and 216. When the period, t, has been reached, the MS transmits a CSP which the BS receives, as shown in step 218. The BS then processes the CSP transmitted by the MS and optimizes at least one communications parameters accordingly as in step 220. The BS then transmits its data packet to the MS with a Frame Code header that provides details on the optimized communications parameters as in step 222. The MS receives the data packet, processes the Frame Code information and optimizes its communications parameters according to the communications parameters proposed and used by the BS. The MS then demodulates the rest of the data signal as shown in step 224. If the communication between the two units is to continue, step 226, the process repeats itself at step 202 as shown. Otherwise the communication is terminated as in step 228.

In some adaptive communications systems the two communicating units transmit on a number of concatenated time slots within a TDMA time frame. In this situation the time period, t, can be removed and the CSP transmission appended to the transmit data block to ensure a more efficient use of the communications channel.

Figure 4:
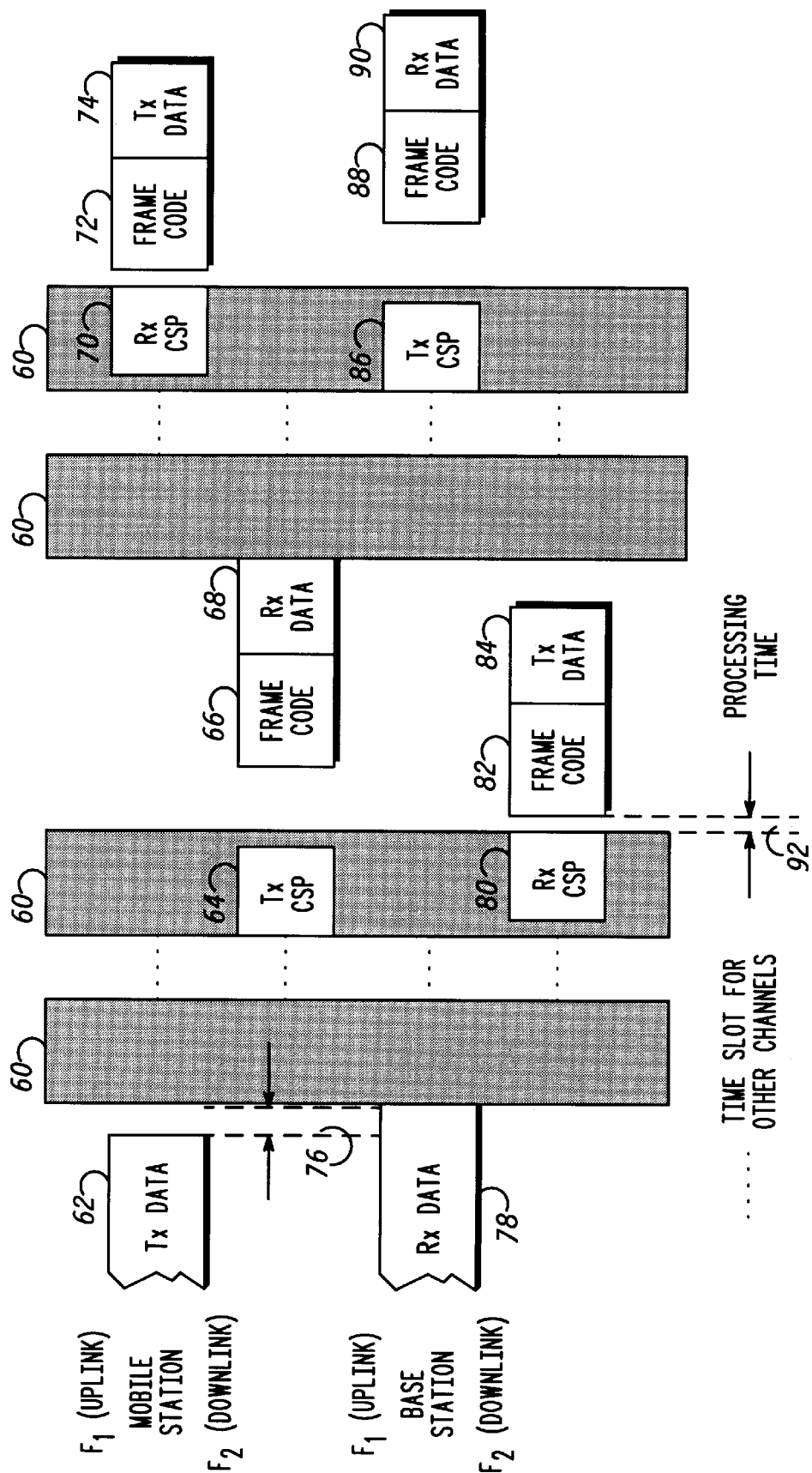
FIG. 4 shows a timing diagram for a Frequency Division Duplex (FDD), Time Division Multiple Access (TDMA) communications system, according to a second aspect of the preferred embodiment of the invention.

Although the preferred embodiment of the invention is described with regard to a TDD FDMA system it is within the contemplation of the invention that the proposed reverse channel sounding packet technique is applicable to alternative multiple access schemes. By way of explanation only, the provision for Channel Sounding Packet information is also described for a Frequency Division Duplex (FDD) Time Division Multiple Access (TDMA) scheme, as shown in FIG. 4.

In a FDD TDMA scheme, communication between two units is performed by transmitting and receiving signals on two frequencies. The communication channels (frequencies) are divided into time divisions (slots), as known to those skilled in the art. Hence, for the CSP to provide accurate frequency-correlated data in such a FDD system, the communicating units need to transmit the CSP on their respective receive frequencies prior to receiving the data signal. By way of example the two communicating units are described as a Mobile Station MS and a Base Station BS with communications from the MS to the BS being on the uplink F1 frequency channel and from the BS to the MS being on the downlink F2 frequency channel.

The MS transmits data 62 to the BS with the BS receiving the transmitted data 78 after a system and channel propagation delay period 76. Prior to anticipating the BS responding and transmitting a data signal back to the MS, the MS transmits the CSP 64 on its downlink receive frequency F2. The BS receives the CSP 80 and processes the CSP to determine at least one current channel characteristic e.g. multipath, fading effects. The BS then optimizes its communications parameters according to the processed CSP information and transmits data to the MS after this processing and optimization period 92. The transmission from the BS to the MS on the downlink F2 frequency, includes an initial Frame Code block 82 providing details of the optimized communications parameters used in the subsequently transmitted data 84. The MS receives the Frame Code block 66, optimizes its communications parameters according to the optimized communications parameters proposed and used by the BS, and then receives and demodulates the data 68.

This process repeats itself for communications from the MS to the BS on the uplink F1 frequency, the receive frequency for the BS. The BS transmits a CSP 86 which is received by the MS and processed 70. The MS then optimizes its communications parameters, includes the details of the optimized communications parameters in the transmitted Frame Code 72 appended to the transmit data 74. The BS receives the Frame Code 88, optimizes its communications parameters accordingly and then receives the transmitted data 90. In FIG. 4 the time periods are not drawn to scale and the shaded areas 60 signify time slots that are reserved for CSPs. As this is a TDMA system other time slots can be used by other MSs and BSs as signified by the dotted lines.

Similarly, the FDD TDMA system using reverse channel sounding packets can be extended to a continuous full duplex system. In a continuous full duplex communications system, both communicating units transmit on one frequency and receive simultaneously on a different frequency.

In most TDMA communications systems a timing synchronisation pattern is transmitted to enable the receiver to synchronize its timing circuitry for accurate demodulation of the transmitted data. Advantageously the transmission and reception of the CSP can be used within the communications system as an alternative method for providing timing synchronization, thereby precluding the need to send a specific timing synchronization data packet.

In addition, the optimization of at least one of the communications parameters beyond at least one of a predetermined communications parameter threshold level, e.g. a signal strength level of −90 dBm, can be advantageously used within a communications system to initiate a hand-off process.

Should the communications channel characteristics not vary significantly at any time during a particular communication it is within the contemplation of the invention that the CSP transmissions are then disabled. In such a situation the transmission of a channel sounding packet bit is used to indicate whether channel sounding packet information is being transmitted from the first communications unit to the second communications unit.

There are a number of communications parameters that can be optimized within a communications system using the information gained from the CSP. One such communications parameter is the antennae to be used for communications, if the communications system uses a distributed antenna diversity scheme.

An assisted distributed antenna diversity scheme is a scheme where the communicating units have a number of antennae available for transmitting and receiving signals. Each of these antennae provide the transmitting station with a different channel path for transmitting signals to the receiving station. For example, if current channel information can be determined by a Base Station, the information can be used to select which antenna is best suited e.g. has best channel gain, for transmission and reception of signals to Mobile Stations with the communications system.

Figure 5:
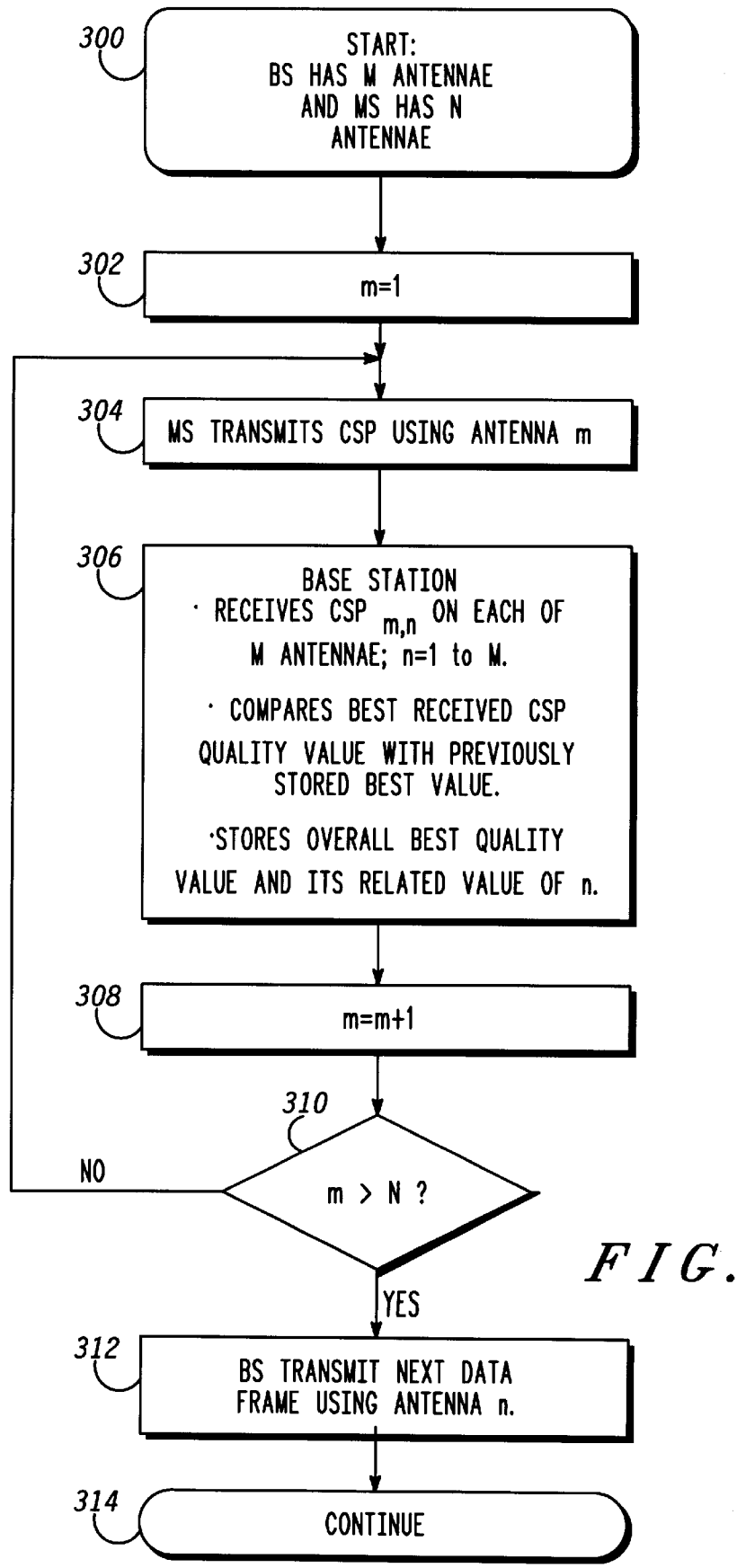
FIG. 5 shows a flow diagram illustrating the method of using reverse channel sounding information in a communications system that employs a distributed antenna diversity scheme according to a third aspect of the preferred embodiment of the invention.

FIG. 5 shows a flow diagram illustrating a method for implementing such a reverse channel sounding packet technique in an assisted distributed antenna diversity system. A Base Station BS has 'M' antennae, a Mobile Station MS has 'N' antennae, as shown in step 300, and the BS wishes to transmit data to the MS. An antenna counter "m" is initiated by the MS as in step 302, and the MS transmits a CSP using a first antenna (m=1) as shown in step 304. The BS receives the CSP on each of its M antennae, processes the information and then compares the received quality values from the different M antennae to determine, and then store, the optimum antenna choice, for the first CSP transmitted as shown in step 306. The antenna counter is then incremented (m=2) at the MS, as in step 308, and if a second antenna is available (i.e. m<=N), step 310, the MS transmits the CSP again using the second antenna, step 304. The BS processes the CSP information to determine whether an improved signal has been received from the second antenna of the MS on any of the N base antennae as shown in step 306. This process is repeated until all of the MS's antennae have transmitted a CSP. The antenna of the BS that received the best quality CSP is then selected for the transmission of data from the BS to the MS, in the next time frame, as in step 312. This process is continued for further transmissions as shown in step 314. The reciprocal nature of the propagation channel ensures that the optimum antenna when receiving the CSP from the MS is also the optimum antenna for transmitting data from the BS to the MS. The BS may decide to transmit to the MS on more than one antenna to allow the communications system the ability to use beamforming techniques as known to those skilled in the art.

Although the preferred embodiment is described with regard to implementation in a TDD FDMA system it is within the contemplation of the invention that the reverse channel sounding packet invention is also applicable to other communications systems such as those using Code Division Multiple Access (CDMA) schemes.

In a fourth aspect of the preferred embodiment of the invention, current channel information is obtained in a point-to-point non-time-continuous Direct Sequence (DS) CDMA communication system operating with a randomly time-varying channels to allow optimization of the transmission parameters (e.g. transmitter output power, coding rate) of the DS CDMA system. The invention provides an alternative channel sounding method to that used in full-duplex CDMA systems and addresses the need for accurate real-time channel sounding information in time-discontinuous CDMA systems. In particular, the invention is applicable to a digital mobile radio system where the channel is fading.

Figure 6:
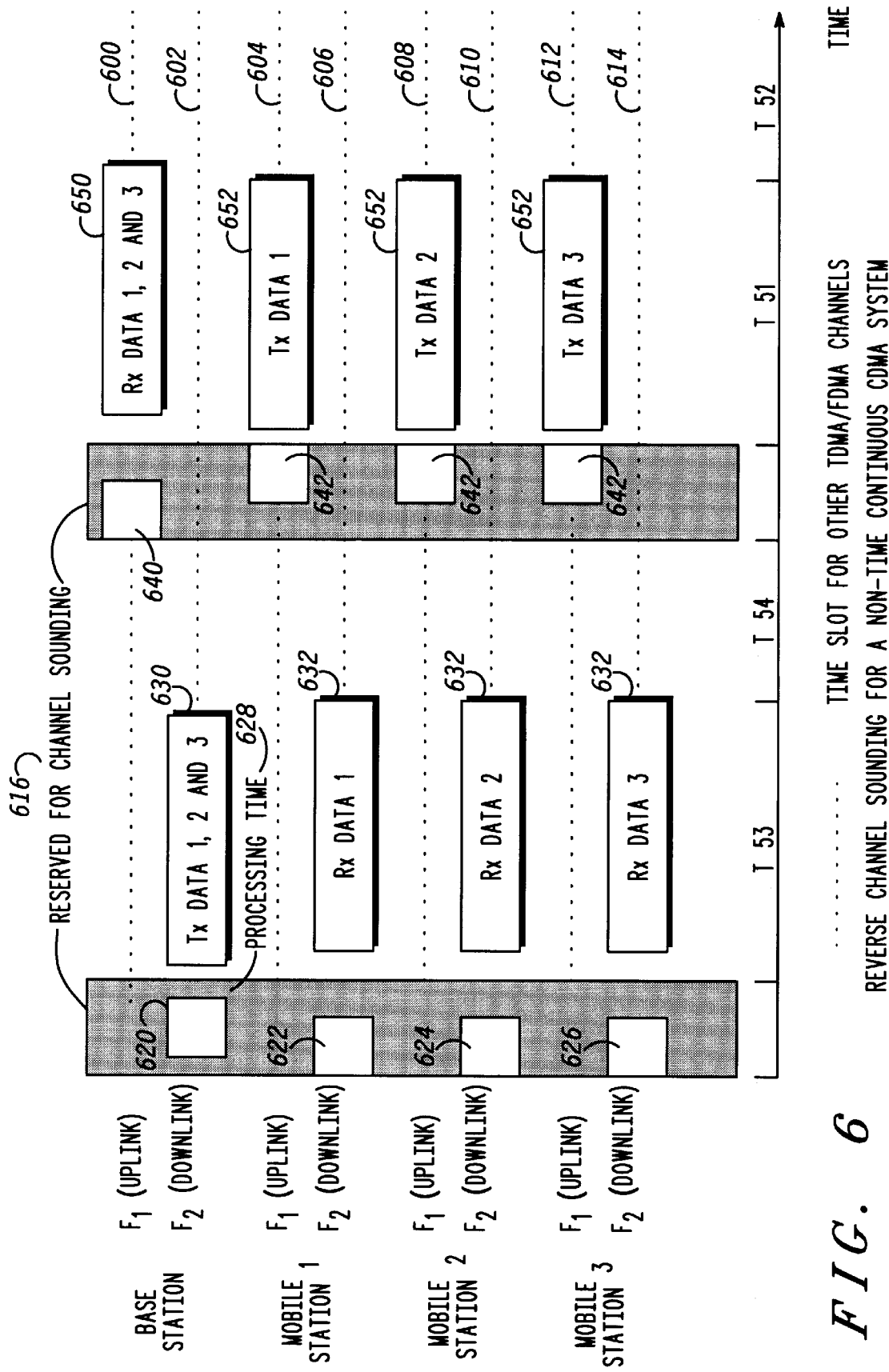
FIG. 6 shows a timing diagram illustrating communication signals between a Base Station and a Mobile Station in a non-time continuous code division multiple access (CDMA) communications system in accordance with a fourth aspect of the preferred embodiment of the invention.

FIG. 6 shows a timing diagram illustrating communication signals between a BS and a MS in a non-time continuous code division multiple access (CDMA) communications system in accordance with the fourth aspect of the preferred embodiment of the invention. A base station (BS) is communicating with several mobile stations MSs, i.e. MS1, MS2 and MS3 via a frequency uplink channel F1 and a frequency downlink channel F2. The communications received at the BS on F1 are given on timing graph 600 and the communications transmitted at the BS on F1 are given on timing graph 602. The communications transmitted by MS1, MS2 and MS3 to the BS on F1 are shown on timing graphs 604, 608 and 612 respectively. The communications received at MS, MS2 and MS3 from the BS on F2 are shown on timing graphs 606, 610 and 614 respectively. In the non-time, continuous DS CDMA system proposed in [2], the available transmission time is divided into time slots so that a mobile radio system can operate with a CDMA system that can also co-exist with FDMA/TDMA sub-systems in the same frequency band. The communication system according to the fourth aspect of the preferred embodiment of the invention operates with four (4) time slots (TS1, TS2, TS3 and TS4) with the uplink frequency channel transmission of the MSs occupying TS1 and the downlink frequency channel reception of the MSs occupying TS3. All three (3) MSs can simultaneously use TS3 on F2 due to the code division process and each of the 3 MSs are assigned different orthogonal codes. The other available TSs of TS2 and TS4 may be used by the FDMA/TDMA part of the system that shares the frequency bands F1 and F2. A reverse channel sounding scheme will be a suitable way to implement power control in such a system.

In this proposal, the receiver of at least one of MS1, MS2 or MS3 transmits a known chip sequence 622, 624, 626 respectively (of say, M chips) to the transmitter just prior to the start of a transmission of a frame of data from the BS. The transmitter then uses this known sequence to evaluate the condition of the channel. Due to the reciprocal nature of the communications channel the channel state in the forward channel is the same as the channel state in the reverse channel. Because a feedback path is not required, the time between a channel sounding and the actual transmission period is considerably shortened. Hence, the channel information obtained is more current and accurate. This allows for a better adaptation to be made to the transmitted signal by the transmitter. The channel state information obtained is used to adapt the transmission rate, modulation format, coding rate, pre-filtering characteristics, packet length or signal power of the transmitter.

Time synchronization is assumed to exist throughout the system. Using CDMA techniques, the BS multiplexes all three signals to be transmitted to the MSs into TS3 and transmits the information signal 630 on F2 after the short processing delay 628. Each MS receives the information signal 632 transmitted from the BS, after a short propagation delay. Each MS receiving information signals from the BS then demultiplexes their particular information signal to extract appropriate data that is addressed to that particular MS.

Subsequently, the three MSs then simultaneously transmit their replies on F1 in TS1 as shown in FIG. 6. This is possible due to the unique orthogonal spreading code used by each MS. Just prior to the MSs transmitting data to the BS, the BS transmits a unique chip sequence (CSCS) 640 to the MSs on the uplink F1. Each MS receives the unique chip sequence 642 and demodulates the sequence to identify the individual channel characteristics applicable from the BS to each of the MSs. As previously described for the downlink F2 channel, the data frame from the BS will contain adaptation information so that each MS receiver processor can recover the data. No multiplexing or demultiplexing is needed in this case. Each MS then adapts its transmission parameters (e.g. transmission power, spreading factor, coding rate) according to the processed CSCS information. This adaptation information can be embedded into the data frame that is transmitted to the BS, by the MSs in data transmissions 652, 654 and 656, so that the BS receiver processor can recover the data correctly when the BS receives the transmissions in 650. In theory, a fast receiver processor can work out the transmission adaptation without the embedded adaptation information. The BS then demultiplexes the received signal to separate the data from each of the MS.

Should the communications channel characteristics, e.g. signal strength, fading or multipath effects etc., not vary significantly at any time during a particular communication it is within the contemplation of the invention that the channel sounding chip sequence transmissions are then disabled. In such a situation the transmission of a channel sounding chip sequence bit is used to indicate whether channel sounding information is being transmitted from the first communications unit to the second communications unit. Advantageously the transmission and reception of the channel sounding chip sequence can be used within the communications system as an alternative method for providing timing synchronization, thereby precluding the need to transmit specific timing synchronization data.

It is also within the contemplation of the invention that the communications system includes additional communications units for communicating with the first communications unit, e.g. a base station. In such a situation, with the base station transmitting and receiving simultaneously to a number of mobile units, via the use of different orthogonal codes to distinguish which transmission is for which mobile unit, the base station will receive channel sounding chip sequences from each communications unit. Each mobile unit will receive and process their channel sounding chip sequence to determine at least one channel characteristic. When the channel condition merits, at least one communication parameter of a communications unit is optimized based on the at least one channel characteristic. This information is then transmitted to the base station with the optimized communication parameter or the at least one channel characteristic being embedded in the transmission from the communications unit.

In summary, in the fourth aspect of the preferred embodiment of the invention, a reverse channel sounding system for a time-discontinuous CDMA system is proposed. The system uses a channel sounding chip sequence (CSCS) transmitted by the receiver to the transmitter, just before a normal data transmission on the receive frequency. This optimizes the accuracy of the information on the channel state since the two channels are reciprocal and the time and frequency coherence of the CSCS transmission and the data transmission are maximized. The information obtained allows real-time transmission adaptation which leads to a better use of the channel capacity. Unlike current forward channel sounding systems, a reverse channel sounder is used thereby allowing more accurate transmitter based decisions.

In a fifth and sixth aspect of the invention, an improved method of hand-off between two access schemes is provided. In particular methods of adapting communications parameters according to channel sounding information, determining whether hand-off is required due to the channel sounding information, and performing hand-off between two time-discontinuous systems are described. The originating time-discontinuous systems can be either CDMA (fifth aspect) or TDMA (sixth aspect) and the invention in this regard resolves hand-off problems in third generation systems and between third and second generation systems where a mixed deployment of access technologies are likely to be implemented to address specific service environments. The invention provides a more accurate assessment of whether a hand-off is required when compared to other known hand-off algorithms.

A method for adapting at least one communication parameter of a communications unit is provided. The communication unit obtains communication channel information using a reverse channel sounding technique and is described with regard to communications between the first communications unit and a second communications unit on a communication channel of a first time-discontinuous communications system. The method includes transmitting channel sounding information, from the second communications unit to the first communications unit, a time period, t, prior to transmission of an information signal from the second communications unit to the first communications unit. There is no handshaking of channel sounding information between the first and second communications unit, as in the case of forward channel sounding techniques. The channel sounding information is received at the first communications unit and processed to determine a current state of the communication channel. Dependent upon whether the state of the channel merits it, a communication parameter of the first communications unit may be optimized. An information signal is transmitted from the first communications unit to the second communications unit containing information indicative of the at least one optimized communication parameter, where it is received and processed. A receiver demodulation process of the second communications unit is then adapted in accordance with the channel sounding information and/or the optimized communication parameter contained in the information signal from the first communications unit.

A method for determining whether hand-off between two time-discontinuous communications systems is required for a first communications unit using a reverse channel sounding technique to assess a current state of a communication channel is also described. In addition to the adaptation of communications parameters previously described, the method includes comparing the optimized communication parameter with at least one predetermined communication parameter threshold level to assess whether the communication link has deteriorated. If the communication has deteriorated sufficiently, i.e., an optimized communication parameter has exceeded the threshold level the second communications unit monitors channel sounding information of the second time-discontinuous communication system, to determine whether communication to and from the second communications unit would benefit from handing-off to the second time-discontinuous communication system. If the communication link would benefit from a hand-off, a hand-off procedure is initiated at the second communications unit.

The fifth and sixth aspects of the preferred embodiment of the invention are shown in FIGS. 7–10. The information gained from the reverse channel sounding process is used to initiate, and complete a hand-off operation between any two communications systems (CDMA<—>TDMA<—>FDMA and any combination thereof). FIGS. 7 to 10 provide flow charts of the preferred methods of hand-off between TDMA and CDMA systems, as will be required with the future deployment of mixed technologies, using channel sounding information to determine whether a hand-off is required.

Figure 7:
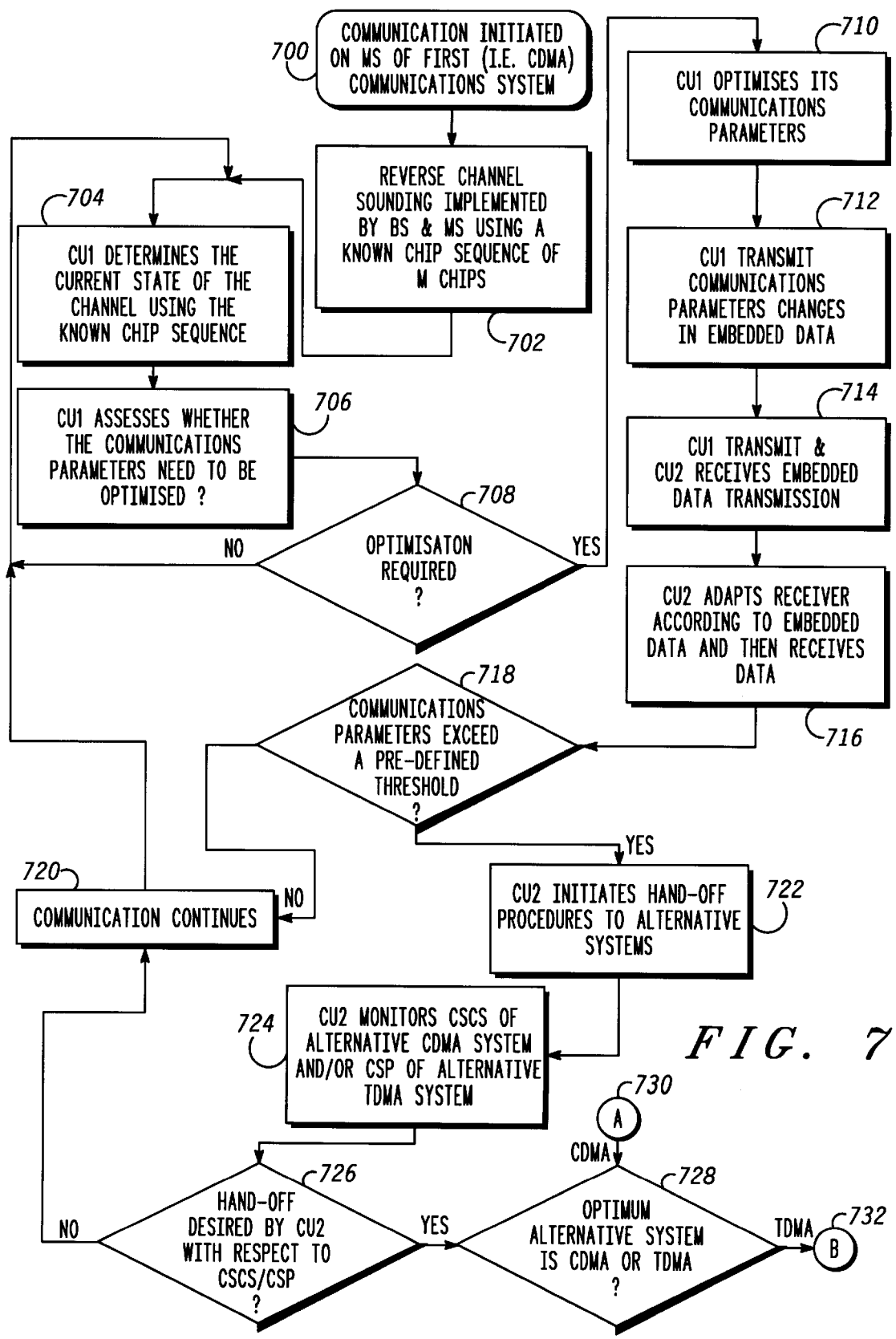
FIG. 7 shows a flow chart for determining whether a hand-off is required in such a CDMA system in accordance with a fifth aspect of the preferred embodiment of the invention.
Figure 8:
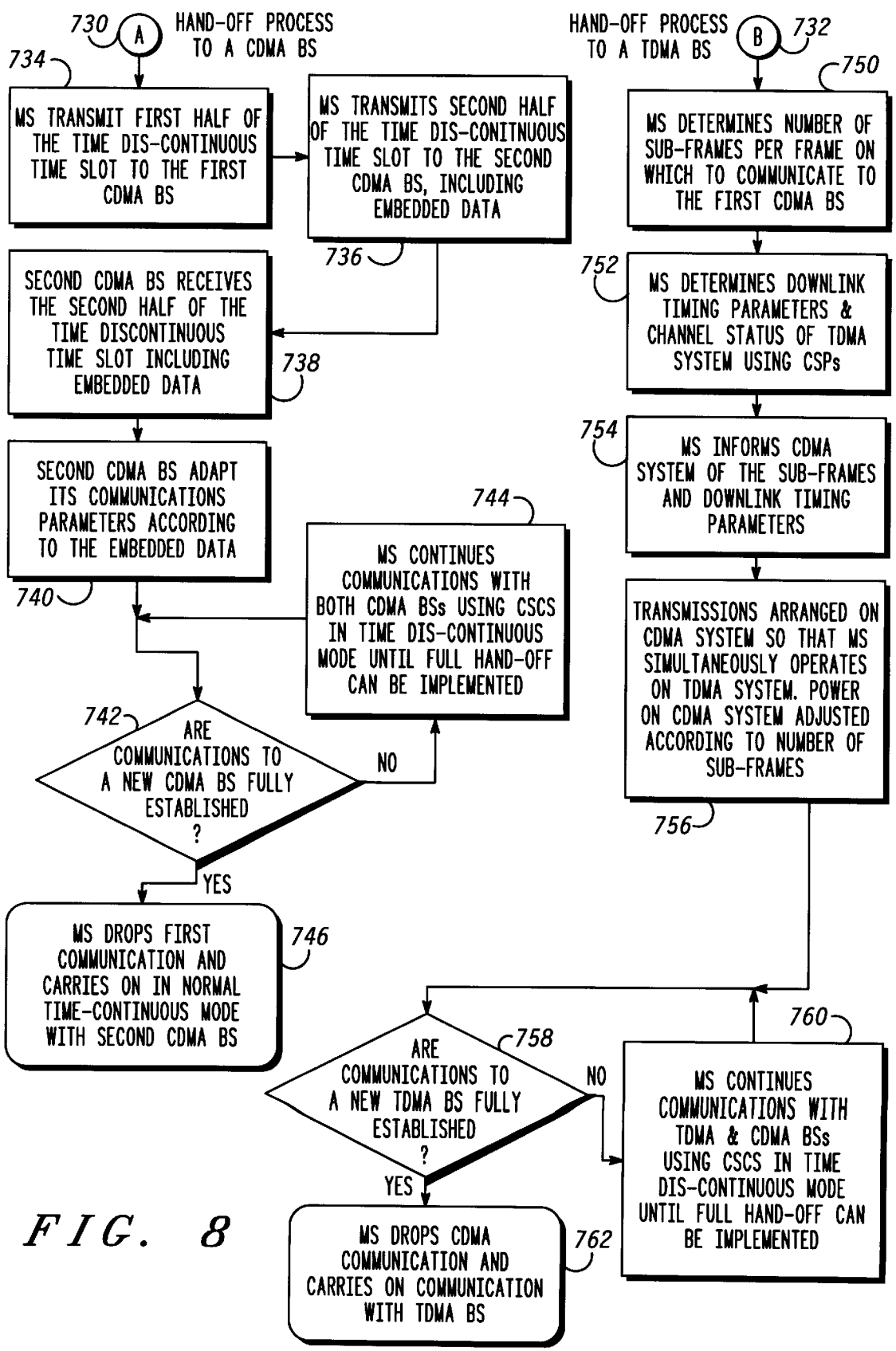
FIG. 8 shows a preferred method of hand-off to alternative CDMA or TDMA communications systems in accordance with the fifth aspect of the preferred embodiment of the invention.

FIG. 7 shows a flow chart detailing the process involved in determining whether a hand-off is required, and FIG. 8 shows a method for performing a hand-off, from a CDMA system to another time-discontinuous system. The CDMA system uses CSCS information to determine whether communications parameters of that system need to be optimized. A first communications unit (CU1) may be either a BS or a MS and correspondingly the second communications unit (CU2) would be the converse. A communication is initiated on, say, a MS of a first time-discontinuous communication system, e.g. a CDMA system, as shown in step 700. A reverse channel sounding technique, as previously described, is implemented by a BS and a MS using a known chip sequence of M chips, as in step 702. The second communications unit CU2 transmits a CSCS to CU1. The CU1 receives the CSCS, demodulates the information and determines the current state of the communications channel using the information of the known chip sequence, as shown in step 704. The CU1 assesses whether the communications parameters need to be optimized, as in step 706, and if no optimization is required in step 708, the communication parameters remain unchanged until the next CSCS chip sequence is determined, as in step 704. If the communication parameters in step 708 require optimization the CU1 optimizes its communication parameters, as in step 710. In the preferred embodiment of the invention, the CU1 transmits the communication parameter changes to CU2 in the embedded data, as shown in step 712. The CU2 receives the embedded data transmission in step 714 and adapts its receiver demodulation process according to the embedded data and receives the transmitted data, as shown in step 716.

To determine whether a hand-off to another communication BS or another communication system is required, the optimized communication parameters are compared with a pre-defined threshold level, as in step 718. If one of the optimized communication parameters do not exceed the pre-defined threshold level in step 718, the communication continues, as in step 720, and the process returns to step 704. If at least one of the optimized communication parameters exceed the pre-defined threshold level in step 718, the CU2 initiates hand-off procedures to an alternative BS or an alternative communication system, as shown in step 722. The CU2 monitors the CSCS of alternative CDMA systems and/or the CSP of alternative time-discontinuous communication systems, e.g. TDMA systems, as in step 724. If the hand-off is not desired, given the alternative CSCS or CSP information monitored by CU2, as in step 726, the communication continues, as shown in step 720. If a hand-off is desired by CU2 in step 726, the choice of alternative communication systems is made, as shown in step 728, with the CDMA option of step 730 and the TDMA option of step 732, being described in FIG. 8

As mentioned with regard to FIG. 7, either the BS or the MS may initiate adaptation of the communications parameters, or initiate the hand-off request and perform the hand-off as described in FIG. 8. Should the adaptation of at least one communications parameter exceed a threshold, the CU1, for example, would initiate the hand-off request in the CDMA system and monitor alternative accessible systems. Advantageously, the hand-off from the CDMA system may be made to another CDMA (possibly using CSCSs) or a TDMA (using Channel Sounding Packet (CSP)) systems.

FIG. 8 shows the preferred methods of hand-off from a CDMA communications system to another time-discontinuous communications system such as an alternative CDMA or TDMA system. The technologies used in FIG. 8 for the hand-off process utilized the extra CSCS and/or CSP information. To perform a hand-off process a CDMA system must enter a time-discontinuous mode of operation as described in a co-pending GB patent application no. 9501697.8. In the case of a CDMA system handing-off to a TDMA system the MS must determine when (in the time-domain, with regard to the timing of both systems) to communicate to both the CDMA and TDMA BSs whilst the hand-off is being performed.

A method for performing a communication hand-off from a Code Division Multiple Access communications system to another time-discontinuous communications system is described in FIG. 8. It is assumed in the described method that both time-discontinuous communication systems use a reverse channel sounding technique to obtain a current assessment of at least one channel characteristic of a communications link. However, it is within the contemplation of the invention, that one of the communication systems involved in the hand-off process may not employ such a channel sounding technique. A first and second communications units operating on the CDMA system enter a time-discontinuous mode of operation for communications once hand-off to another time-discontinuous communications system is desired, as described previously. The entering of a time-discontinuous mode of operation allows the communications units to monitor, receive or transmit to other communications units or systems during their periods of transmission inactivity. Channel sounding transmissions of the time-discontinuous communications system are monitored by the first communications unit during such periods of non-transmission on the Code Division Multiple Access communications system. Once communications between the first communications unit and a third communications unit on the second time-discontinuous communications system have commenced, according to the channel sounding information and timing parameters of the time-discontinuous communications system obtained, the first communications unit communicates in alternative time periods in the time-discontinuous mode, to both a second communications unit on the CDMA system and to the third communications unit in the time-discontinuous system until full hand-off to the second time-discontinuous communications system can be completed.

It is likely that there is a registration requirement by the first communications unit with the second time-discontinuous communications system and that power control levels will need to be adjusted for transmissions on CDMA system(s) according to a rate of transmissions in the time-discontinuous mode, so that the power spectral density of transmissions is unchanged.

If the second time-discontinuous communications system is a second Code Division Multiple Access communications system information containing embedded data obtained from the channel sounding process detailing at least one communication parameter being used is transmitted from the first communications unit to the third communications unit. The third communications unit adapts its transmissions accordingly.

When the hand-off process is to be from a first CDMA system to a second CDMA system, as in step 730 of FIG. 8, the MS transmits in the first half of a time-discontinuous time slot to the first CDMA system, as in step 734, and transmits in the second half of the time-discontinuous time slot to the second CDMA system with the transmission including the embedded data, as shown in step 736. A BS of the second CDMA system receives the second half of the time-discontinuous time slot, including the embedded data, as in step 738, and adapts its communication parameters according to the embedded data, as shown in step 740. If the communications are not fully established between the MS and the BS of the second CDMA system, as in step 742, the MS continues to communicate with both the first and second communication systems using CSCSs in a time-discontinuous mode until a full hand-off can be completed, as in step 744. If the communications to the BS of the second CDMA system are fully established in step 742, the MS terminates the communication with the first CDMA communication system and carries on in normal time-continuous mode operation with the BS of the second CDMA system, as shown in step 746.

If the hand-off process is to be between a CDMA system and a TDMA system, as in step 732, the MS determines the number of sub-frames per frame on which to communicate to the first CDMA BS, as shown in step 750. The MS determines downlink timing parameters and channel status of the TDMA system using CSPs, as in step 752. The MS informs the CDMA system of the sub-frames and downlink timing parameters to be used with communications to the CDMA system during the hand-off process, as shown in step 754. Transmissions are arranged on the CDMA system so that the MS simultaneously operates on the TDMA system. The power control used on the CDMA system is adjusted according to the number of sub-frames being used for transmission, as in step 756. If communications to the TDMA system are not fully established, as in step 758, the MS continues to communicate with both the TDMA and CDMA BSs using CSCS in the time-discontinuous mode of operation and the CSP on the TDMA system until full hand-off to the TDMA system is implemented, as shown in step 760. If the communications to the TDMA system are fully established in step 758, the MS terminates the CDMA communication and carries on communication with the TDMA BS, as shown in step 762.

In this manner, communication has been transferred from a first CDMA system to a second CDMA system or a TDMA system when the channel condition merits a hand-off process.

Figure 9:
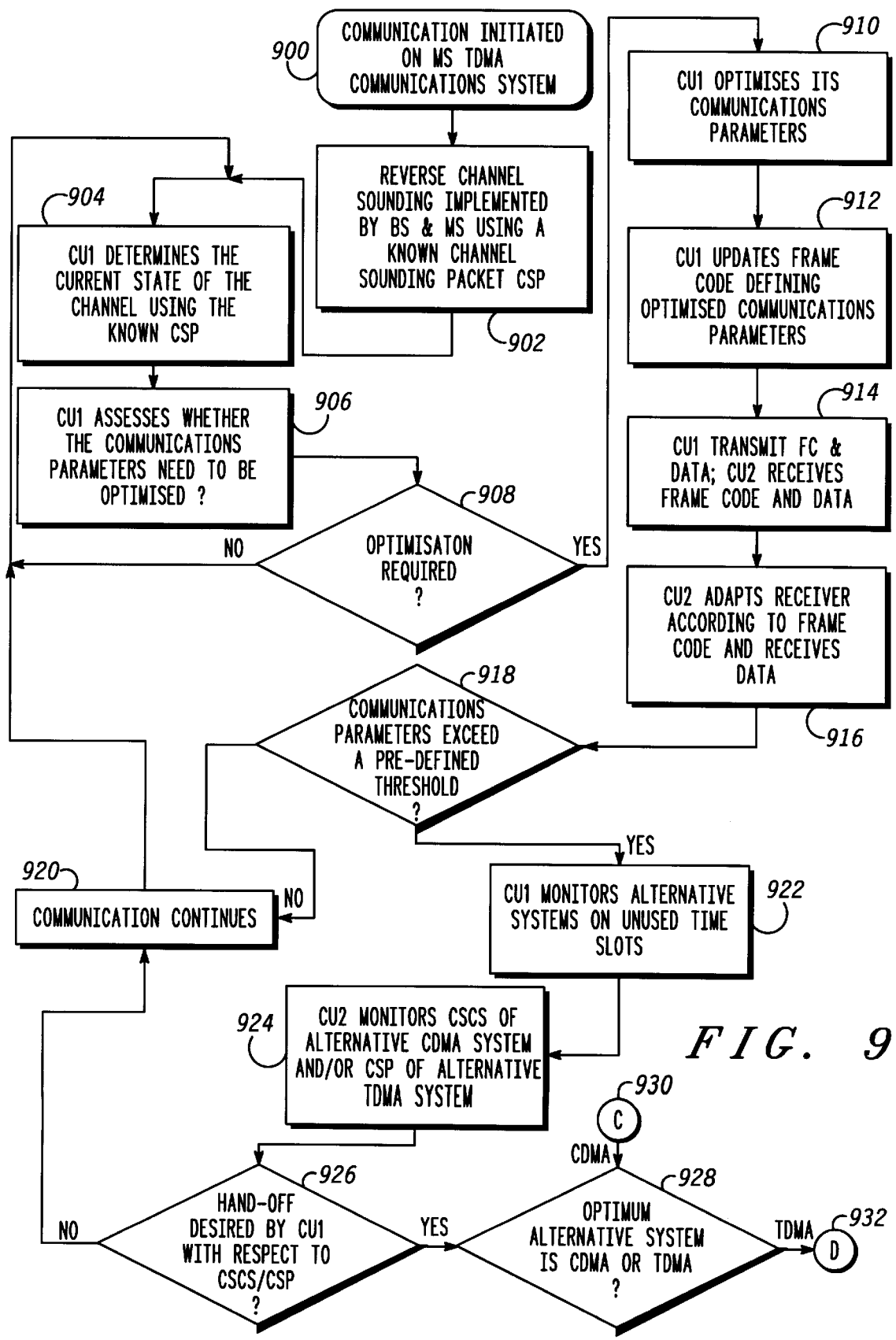
FIG. 9 shows a flow chart determining whether a hand-off is required in a TDMA system in accordance with a sixth aspect of the preferred embodiment of the invention.
Figure 10:
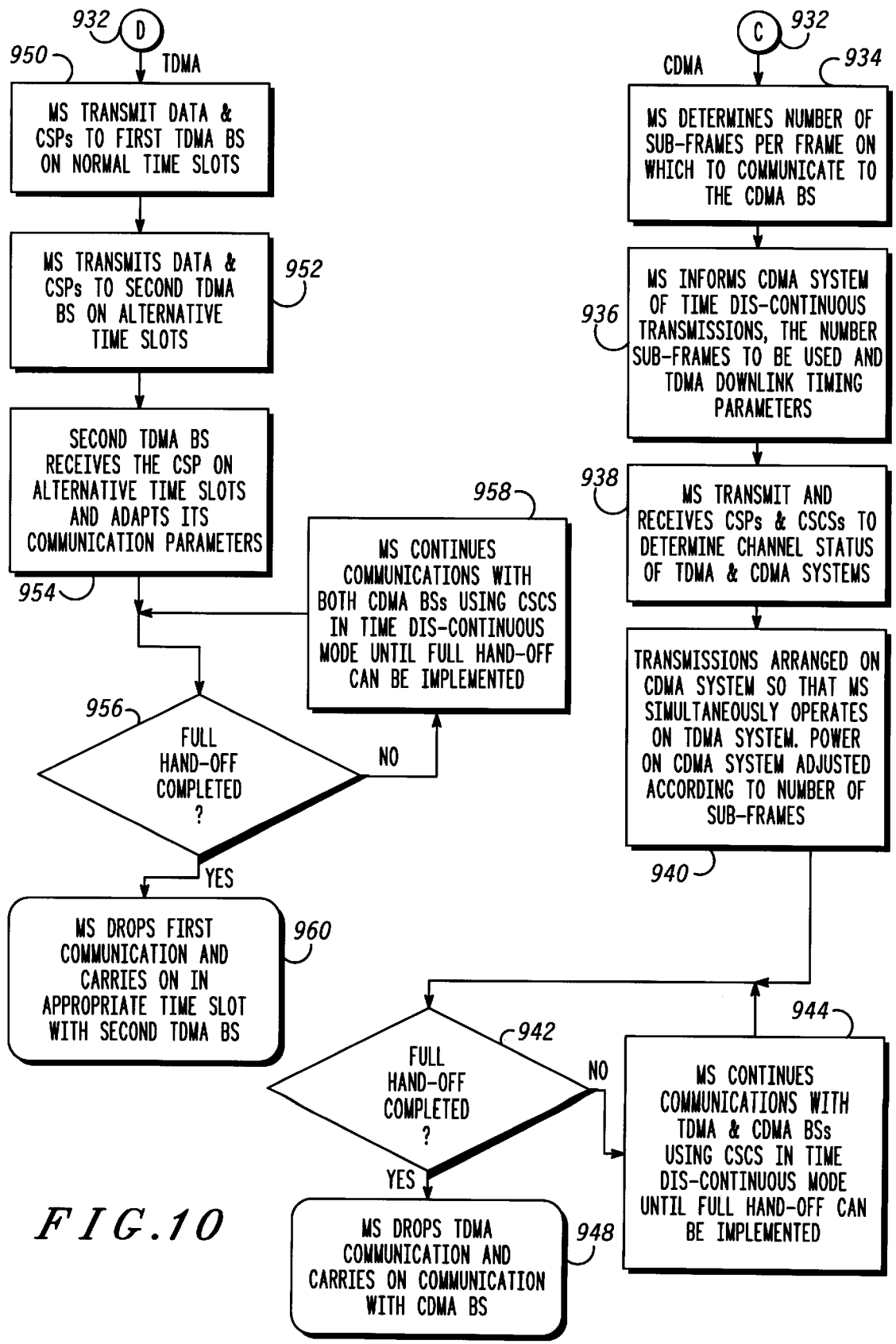
FIG. 10 shows a preferred method of hand-off to alternative CDMA or TDMA communications systems in accordance with the sixth aspect of the preferred embodiment of the invention.

FIG. 9 shows a flow chart detailing the process involved in determining whether a hand-off is required in a TDMA system. The TDMA system uses CSP information to determine whether communications parameters of that system need to be optimized. FIG. 9 shows a flow chart detailing the process involved in determining whether a hand-off is required and FIG. 10 shows a method for performing a hand-off from a TDMA system to another time-discontinuous system. The TDMA system uses CSP information to determine whether communications parameters of that system need to be optimized. A first communications unit (CU1) may be either a BS or a MS and correspondingly the second communications unit (CU2) would be the converse.

A communication is initiated on, say, a MS of a first time-discontinuous communication system, e.g. a TDMA system, as shown in step 900. A reverse channel sounding technique, as previously described, is implemented by a BS and a MS using a known channel sounding packet, as in step 902. The second communications unit CU2 transmits a CSP to CU1. The CU1 receives the CSP, demodulates the information and determines the current state of the communications channel using the information of the known CSP, as shown in step 904. The CU1 assesses whether the communications parameters need to be optimized, as in step 906, an if no optimization is required in step 908, the communication parameters remain unchanged until the next CSP is determined, as in step 904. If the communication parameters in step 908 require optimization the CU1 optimizes its communication parameters, as in step 910. In the preferred embodiment of the invention, the CU1 transmits the communication parameter changes to CU2 in the including frame code information and data, as shown in step 912. The CU2 receives the frame code information and data transmission in step 914 and adapts its receiver demodulation process according to the frame code information and data and receives the transmitted data, as shown in step 916.

To determine whether a hand-off to another communication BS or another communication system is required, the optimized communication parameters are compared with a pre-defined threshold level, as in step 918. If one of the optimized communication parameters does not exceed the pre-defined threshold level in step 918, the communication continues, as in step 920, and the process returns to step 904. If at least one of the optimized communication parameters exceed the pre-defined threshold level in step 918, the CU2 initiates hand-off procedures to an alternative BS or an alternative communication system, as shown in step 922. The CU2 monitors the CSP of alternative TDMA systems and/or the CSCS of alternative time-discontinuous communication systems, e.g. CDMA systems, as in step 924. If the hand-off is not desired, given the alternative CSP or CSP information monitored by CU2, as in step 926, the communication continues, as shown in step 920. If a hand-off is desired by CU2 in step 926, the choice of alternative communication systems is made, as shown in step 928, with the CDMA option of step 930 and the TDMA option of step 932, being described in FIG. 10.

As mentioned with regard to FIG. 9, either the BS or the MS may initiate adaptation of the communications parameters, or initiate the hand-off request and perform the hand-off as described in FIG. 10. Should the adaptation of at least one communications parameter exceed a threshold, the CU1, for example, would initiate the hand-off request in the TDMA system and monitor alternative accessible systems. Advantageously, the hand-off from the TDMA system may be made to another TDMA (possibly using Channel Sounding Packets CSPs) or a CDMA (using Channel Sounding Chip Sequence (CSCS)) systems.

A method for performing a communication hand-off from a Time Division Multiple Access communications system, having a first communications unit communicating to a second communications unit is provided. Hand-off is described with regard to another time-discontinuous communications system having a third communications unit, wherein both communication systems use a reverse channel sounding technique to obtain a current assessment of at least one channel characteristic of a communications link. The method includes monitoring reverse channel sounding transmissions of the second time-discontinuous communications system by the first communications unit, during periods of non-transmission between the first communications unit and the second communications unit on the Time Division Multiple Access communications system. Dependent upon the channel sounding information obtained the first communications unit determines whether it would benefit from a hand-off to the time-discontinuous communications system using information from the reverse channel sounding transmissions of the time-discontinuous communications system. If hand-off is desired, communication is commenced between the first communications unit and the third communications unit on the time-discontinuous communications system according to the channel sounding information and timing parameters monitored on the time-discontinuous communications system, in such a manner so as not to interfere with communications from the first communications unit to the second communications unit on the Time Division Multiple Access communications system. These communications are continued until full hand-off from the Time Division Multiple Access communications system to the time-discontinuous communications system can be completed.

If the time-discontinuous communications system is a Code Division Multiple Access communications system, the method includes the first communications unit determining a number of sub-frames per frame on which to communicate with the third communications unit on the Code Division Multiple Access communications system, using the monitored channel sounding information, e.g. CSCSs. It is likely that the first communications unit will have to register with the Code Division Multiple Access communications system and in doing so, informs the third communications unit to enter a time-discontinuous mode of operation indicating the number of sub-frames and timing parameters to be used for transmissions from the first communications unit to the third communications unit so as not to interfere with transmissions from the first communications unit to the second communications unit on the TDMA system. Power control levels for communications by the third communications unit will have to be set according to the number of sub-frames to be used for the transmissions.

If the time-discontinuous communications system is a second Time Division Multiple Access communications system, the first communications unit is likely to be required to register with the second Time Division Multiple Access communications system and the first communications unit communicates information containing data obtained from the channel sounding process to the third communications unit.

FIG. 10 shows the preferred methods if hand-off is desired to alternative CDMA or TDMA systems. The technologies used in FIG. 10 for the hand-off process utilize the extra CSP or CSCS information. To perform a hand-off process to a CDMA system the CDMA system must enter a time-discontinuous mode of operation. In the case of a TDMA system handing-off to a CDMA system the MS must determine when (in the time-domain, with regard to the timing of both systems) to communicate to both the CDMA and TDMA BSs whilst the hand-off is being performed.

If the hand-off process is to be from a first TDMA system to a CDMA system, as in step 930, the MS determines the number of sub-frames per frame on which to communicate to the CDMA system, as in step 934, and informs the CDMA system to use time-discontinuous transmissions, together with the number of sub-frames to be used and TDMA downlink timing parameters, as shown in step 936. The MS transmits CSPs to the TDMA BS and receives CSCSs from the CDMA system to determine the channel status of TDMA and CDMA systems, as in step 938, and the transmissions are arranged on the CDMA system so that the MS simultaneously operates on both the TDMA and CDMA systems. Power control is adjusted on the CDMA system according to the number of sub-frames, as shown in step 940. If the hand-off is not fully completed in step 942, the MS continues to communicate with both the TDMA communication system and the CDMA communication system using CSCSs in a time-discontinuous mode until a full hand-off can be completed, as in step 944. If the communications to the BS of the CDMA system are fully established in step 942, the MS terminates the communication with the TDMA communication system and carries on in normal time-continuous mode operation with the BS of the CDMA system, as shown in step 946.

If the hand-off process is to be between a TDMA system and a TDMA system, as in step 932, the MS transmits data and CSPs to the first TDMA BS on normal time slots, as shown in step 950. The MS transmits data and CSPs to the second TDMA system on alternative time slots, as in step 952. The second TDMA BS receives the CSP on the alternative time slots and adapts its communication parameters according to the information from the CSP, as shown in step 954. If a hand-off is not completed, as in step 956, the MS continues communications with both TDMA BSs using CSPs on the alternate time slots until full hand-off is completed, as shown in step 958. If the communications to the second TDMA system are fully established in step 958, the MS terminates the first TDMA communication and carries on communication with the second TDMA BS, as shown in step 960.

In this manner, communication has been transferred from a first TDMA system to a second TDMA system or a CDMA system when the channel condition merits a hand-off process.

A first communications unit (CU1) may be either a BS or a MS and correspondingly the second communications unit (CU2) would be the converse. Either the BS or the MS may initiate adaptation of the communications parameters as described, or initiate the hand-off request as described in FIG. 10. Should the adaptation of at least one communications parameter exceed a threshold, the MS would begin monitoring alternative accessible systems in alternative available time slots. These can be CDMA (possibly using CSCSs) or TDMA (using Channel Sounding Packets (CSPs)) systems.

FIG. 10 shows the method of hand-off between a TDMA communication system and another time-discontinuous communication system such as a TDMA or CDMA system whilst utilizing the extra CSCS or CSP information. To perform a hand-off process to a CDMA system, the CDMA system must enter a time-discontinuous mode of operation and the MS must determine when (in the time-domain, with regard to the timing of both systems) to communicate to both the CDMA and TDMA BSs whilst the hand-off is being performed.

A number of ways of initiating a hand-off process may be used. The preferred method shown in FIG. 7 & FIG. 9 uses threshold values for the optimized communications parameters of the communications system. The communications parameters, adapted by the communications units according to the CSCS or CSP data, are as previously described. An alternative method of initiating hand-off could be to monitor alternative systems intermittently. The benefits of each system, for that particular communication, using the available CSP or CSCS information would determine whether a hand-off is desired.

One example of the improvements over existing hand-off techniques that can be achieved using a threshold approach with CSCS or CSP data is given below. In this situation, the extra information available when using a reverse channel sounding approach can assist greatly in the decision of which type of system to hand-off to, assuming a third generation, multiple system, multiple access technology scenario. The invention is an improvement over the patent application [4] as it provides the communications system, with instantaneous and more detailed information on both transmit and receive paths using both the BS and the MS.

Assume a communications unit is using a CDMA wide-area communications system in a rural area and is moving into an urban area. Due to the increasing influence of multipath effects the unit adapts its communications parameters using the CSCS information, namely, by reducing its data-rate. If this data-rate reduction had been used to maintain a given quality of service and had been sufficient to exceed a given data-rate threshold a hand-off may be requested. Concurrently, no adjustment to the power control parameter had been required (i.e. signal strength was adequate). The communicating unit may then determine that it needs to hand-off to say, an in-building communications system which is designed to handle a larger number of multipath, in order to achieve a better communications performance. Consequently, the communicating unit may only need to register or monitor a particular type of system to determine the best approach to continue the communication. It is incumbent in the invention that a number of communications parameters can be used, on their own or in tandem to determine hand-off scenarios.

Advantageously, the proposed hand-off algorithms can also work with existing systems, not as sophisticated as the one being proposed, e.g. the alternative system does not use CSPs or CSCSs. In this situation, the limited signal-strength information available with BER & RSSI measurements may still help in the decision process to decide whether the sophisticated or not-so sophisticated system is the optimum choice to which to hand-off to.

The actual process of handing-off between systems is provided in the individual system protocols. However, the decision on when to initiate such a hand-off request is instigated by a method such as that described. The BS and/or the MS can initiate the hand-off process using the instantaneous information obtained from the transmit and receive paths of the communication link. The use of channel sounding, and in particular reverse channel sounding, to obtain the current channel state information provides a quicker, more efficient way of initiating hand-off between any systems. In the case of third generation systems, wherein a number of time-discontinuous access schemes such as TDMA and certain CDMA systems will exist, the opportunity to have a more comprehensive assessment on the current state of the communication channel will aid the decision of the likely, optimum communications system to which to hand-off to. Using channel sounding information, to determine whether a hand-off to an alternative system is required, is a significant improvement over existing hand-off algorithms.

Thus, a method for determining reverse channel sounding information in a mobile time-discontinuous communications system and a method for using the information to hand-off between the systems is provided. Advantageously, the determining method provides the most current information on at least one channel characteristic on which the optimization of at least one communications parameter is based.

We claim:

1. A method of determining current channel state information in a radio communications system in order to optimize a transmission of an information signal, wherein the radio communications system includes a first communications unit and a second communications unit, the method comprising the steps of:

transmitting a channel sounding packet from the first communications unit to the second communications unit a time period, t, prior to transmission of the information signal by the second communications unit to the first communications unit;

receiving the channel sounding packet at the second communications unit;

processing the channel sounding packet at the second communications unit to determine at least one communication channel characteristic;

optimizing at least one communication parameter of the information signal based on the at least one communication channel characteristic; and transmitting the optimized information signal from the second communications unit to the first communications unit wherein the information signal includes information indicating the at least one communication parameter that has been optimized by the second communications unit.

2. The method according to claim 1, wherein the step of transmitting the information signal includes:

appending frame code information to the information signal to be transmitted from the second communications unit; and transmitting the information signal with the appended frame code information from the second communications unit to the first communications unit to inform the first communications unit of the at least one communication parameter that has been optimized.

3. The method according to claim 1, wherein optimizing of at least one of the communications parameter exceeds at least one of a predetermined communication parameter threshold level thereby initiating a hand-off process.

4. The method according to claim 2, wherein the step of appending frame code information to the information signal includes placing the frame code information in a header of a data packet of the information signal.

5. The method according to claim 1, wherein the time period, t, is selected from a group of switching time, frequency lock time, signal processing time, channel delay, and system delay.

6. The method according to claim 1, wherein the at least one communication parameter may include any of the following: channel transmission rate, modulation type, modulation rate, channel coding rate, source coding rate, transmitter and/or receiver filter responses, packet length, transmitter signal power, adaptive power control levels, whether a channel equalizer is to be used, and which antennae are to be used when the radio communications system uses distributed antenna diversity.

7. The method according to claim 1, wherein the radio communications system operates on a frequency division multiple access (FDMA) time division duplex (TDD) scheme.

8. The method according to claim 1, wherein transmitting a channel sounding packet by the first communications unit includes transmitting a channel sounding packet bit to indicate when channel sounding packet information is being transmitted to the second communications unit.

9. The method according to claim 1, wherein the transmitting of the channel sounding packet by the first communications unit provides timing synchronization information for the second communications unit.

10. The method of determining current channel state information in a radio communications system according to claim 1, wherein the radio communications system is a code division multiple access radio communications system, the channel sounding packet is a channel sounding chip sequence and the information signal contains embedded information of the at least one optimized communication parameter.

11. The method according to claim 10, wherein optimization of the at least one communication parameter exceeds at least one of a predetermined communications parameter threshold level, thereby initiating a hand-off process.

12. The method according to claim 10, wherein the time period, t, is selected from a group of switching time, frequency lock time, signal processing time, channel delay, and system delay.

13. The method according to claim 10, wherein the at least one communication parameter includes any of the following: channel transmission rate, modulation format, channel coding rate, source coding rate, pre-filtering characteristics, packet length, transmitter signal power and power control level.

14. The method according to claim 10, wherein the step of transmitting a channel sounding chip sequence by the first communications unit includes transmitting a channel sounding chip sequence bit to indicate when a channel sounding chip sequence is being transmitted from the first communications unit to the second communications unit.

15. The method according to claim 10, wherein the step of transmitting the channel sounding chip sequence from the first communications unit also provides timing synchronization information for the second communications unit.

16. The method according to claim 10, wherein the radio communications system further includes at least one third communications unit for communicating with the first communications unit, the method further comprising the steps of:

receiving a second channel sounding chip sequence from the first communications unit at the at least one third communications unit, at a simultaneous time to the second communications unit receiving the first channel sounding chip sequence, the second channel sounding chip sequence being of a different orthogonal code to the first channel sounding chip sequence;

processing the second channel sounding chip sequence at the at least one third communications unit to determine at least one second channel characteristic;

optimising at least one communication parameter of the third communications unit based on the at least one second channel characteristic; and transmitting a second information signal from the at least one third communications unit to the first communications unit, wherein the second information signal contains embedded information of the at least one optimized communication parameter of the third communications unit.

17. A method for adapting at least one communication parameter of a communications unit, in accordance with current communication channel information obtained from a reverse channel sounding technique, wherein a first communications unit communicates to a second communications unit on a communication channel of a first time-discontinuous radio communications system, the method comprising the steps of:

transmitting channel sounding information, from the second communications unit to the first communications unit, a time period, t, prior to transmission of an information signal from the second communications unit to the first communications unit;

receiving the channel sounding information at the first communications unit and processing the channel sounding information to determine a current state of the communication channel;

assessing whether at least one communication parameter of the information signal needs to be optimized in accordance with the processed channel sounding information; and optimizing at least one communication parameter when the state of the communication channel requires.

18. The method for adapting at least one communication parameter of a communications unit, in accordance with claim 17, further comprising the steps of:

transmitting the information signal from the first communications unit to the second communications unit, wherein the information signal includes information indicative of the at least one optimized communication parameter;

receiving the information signal containing the at least one optimized communication parameter at the second communications unit;

processing the information signal to obtain the information indicating the at least one optimized communication parameter; and adapting a receiver demodulation process of the second communications unit to receive the information signal from the first communications unit.

19. A method for determining whether hand-off is required from a first time-discontinuous radio communications system to a second time-discontinuous radio communications system, wherein the first time-discontinuous radio communications system includes a first communications unit communicating to a second communications unit on a communication channel using a reverse channel sounding technique to assess a current state of at least one channel characteristic of the communication channel, the method comprising the steps of:

transmitting channel sounding information, from the first communications unit to the second communications unit, a time period, t, prior to transmission of an information signal from the first communications unit to the second communications unit;

receiving the channel sounding information at the second communications unit and processing the channel sounding information to determine the current state of the communication channel;

optimising at least one communication parameter of the second communications unit according to the received channel sounding information;

comparing the at least one optimised communication parameter with at least one of a predetermined communication parameter threshold level;

monitoring, at the second communications unit when the predetermined communication parameter threshold level is exceeded, channel sounding information of the second time-discontinuous radio communication system, to determine whether communication to and from the second communications unit would benefit from handing-off to the second time-discontinuous radio communication system; and initiating a hand-off procedure at the second communications unit when the communication to and from the second communications unit would benefit from handing-off to the second time-discontinuous radio communication system.

20. A method for performing a communication hand-off from a code division multiple access radio communications system, having a first communications unit communicating to a second communications unit, to a time-discontinuous radio communications system having a third communications unit, wherein both radio communication systems use a reverse channel sounding technique to obtain a current assessment of at least one channel characteristic of a communications link, the method comprising the steps of:

entering a time-discontinuous mode of operation for communications between the first communications unit and the second communications unit in the code division multiple access radio communications system, once hand-off to the time-discontinuous radio communications system is desired;

monitoring channel sounding transmissions of the time-discontinuous radio communications system by the first communications unit during periods of non-transmission on the code division multiple access radio communications system;

commencing communications between the first communications unit and the third communications unit on the time-discontinuous radio communications system according to the channel sounding information and timing parameters of the time-discontinuous radio communications system;

continuing communications from the first communications unit to both the second communications unit in the time-discontinuous mode and to the third communications unit in alternative time periods in a time-discontinuous mode until full hand-off to the second time-discontinuous radio communications system can be completed; and communicating from the first communications to the third communications unit in normal time-discontinuous mode of operation when hand-off is completed.

21. The method for performing a communication hand-off from a code division multiple access radio communications system, according to claim 20, the method further comprising the steps of:

registering by the first communications unit with the time-discontinuous radio communications system; and adjusting a power control level for communicating on the code division multiple access radio communications system according to a rate of transmissions in the time-discontinuous mode.

22. The method for performing a communication hand-off from a code division multiple access radio communications system, according to claim 20, wherein the time-discontinuous radio communications system is a second code division multiple access radio communications system, the method further comprising the steps of:

transmitting from the first communications unit to the third communications unit information containing embedded data obtained from the channel sounding process detailing at least one communication parameter being used by the first communications unit in the transmission;

receiving the information, at the third communications unit;

optimising at least one communication parameter at the third communications unit according to the embedded data of the received information;

wherein the steps of continuing and communicating include:

continuing communications from the first communications unit to the second communications unit on the code division multiple access radio communications system and alternatively from the first communications unit to the third communications unit on the second code division multiple access radio communications system in a time-discontinuous mode until a full hand-off can be completed; and communicating from the first communications unit to the third communications unit in a normal time-continuous mode of operation when hand-off is completed.

23. A method for performing a communication hand-off from a time division multiple access radio communications system, having a first communications unit communicating to a second communications unit, to a time-discontinuous radio communications system having a third communications unit, wherein both radio communication systems use a reverse channel sounding technique to obtain a current assessment of at least one channel characteristic of a communications link, the method comprising the steps of:

monitoring reverse channel sounding transmissions of the time-discontinuous radio communications system by the first communications unit, during periods of non-transmission between the first communications unit and the second communications unit on the time division multiple access radio communications system;

determining whether the first communications unit would benefit from a hand-off to the time-discontinuous radio communications system using information from the reverse channel sounding transmissions of the time-discontinuous radio communications system;

commencing communications between the first communications unit and the third communications unit on the time-discontinuous radio communications system according to the channel sounding information and timing parameters monitored on the time-discontinuous radio communications system, and so as not to interfere with communications from the first communications unit to the second communications unit on the time division multiple access radio communications system;

continuing communications from the first communications unit to both the second communications unit and to the third communications unit in the time-discontinuous mode until full hand-off from the Time division multiple access communications system to the time-discontinuous communications system can be completed; and transmitting from the first communications unit only to the third communications unit when hand-off is completed.

24. The method for performing a communication hand-off from a time division multiple access radio communications system according to claim 23 wherein the time-discontinuous communications system is a code division multiple access radio communications system, the method further comprising the steps of:

determining, at the first communications unit, a number of sub-frames per frame on which to communicate with the third communications unit on the code division multiple access radio communications system, using the monitored channel sounding information;

registering, by the first communications unit with the code division multiple access radio communications system;

informing the third communications unit to enter a time-discontinuous mode of operation indicating the number of sub-frames and timing parameters to be used for transmissions from the first communications unit to the third communications unit so as not to interfere with transmissions from the first communications unit to the second communications unit; and adjusting a power control level for communications between the first communications unit and the third communications unit according to the number of sub-frames to be used for the transmissions.

25. The method for performing a communication hand-off from a time division multiple access radio communications system according to claim 23, wherein the time-discontinuous communications system is a second time division multiple access radio communications system, the method further comprising the step of:

registering, by the first communications unit with the second time division multiple access radio communications system; and transmitting from the first communications unit to the third communications unit information containing data obtained from the channel sounding process detailing at least one optimised communication parameter for subsequent communications between the first communications unit and the third communications unit.

* * * * *